Patented Nov. 21, 1950

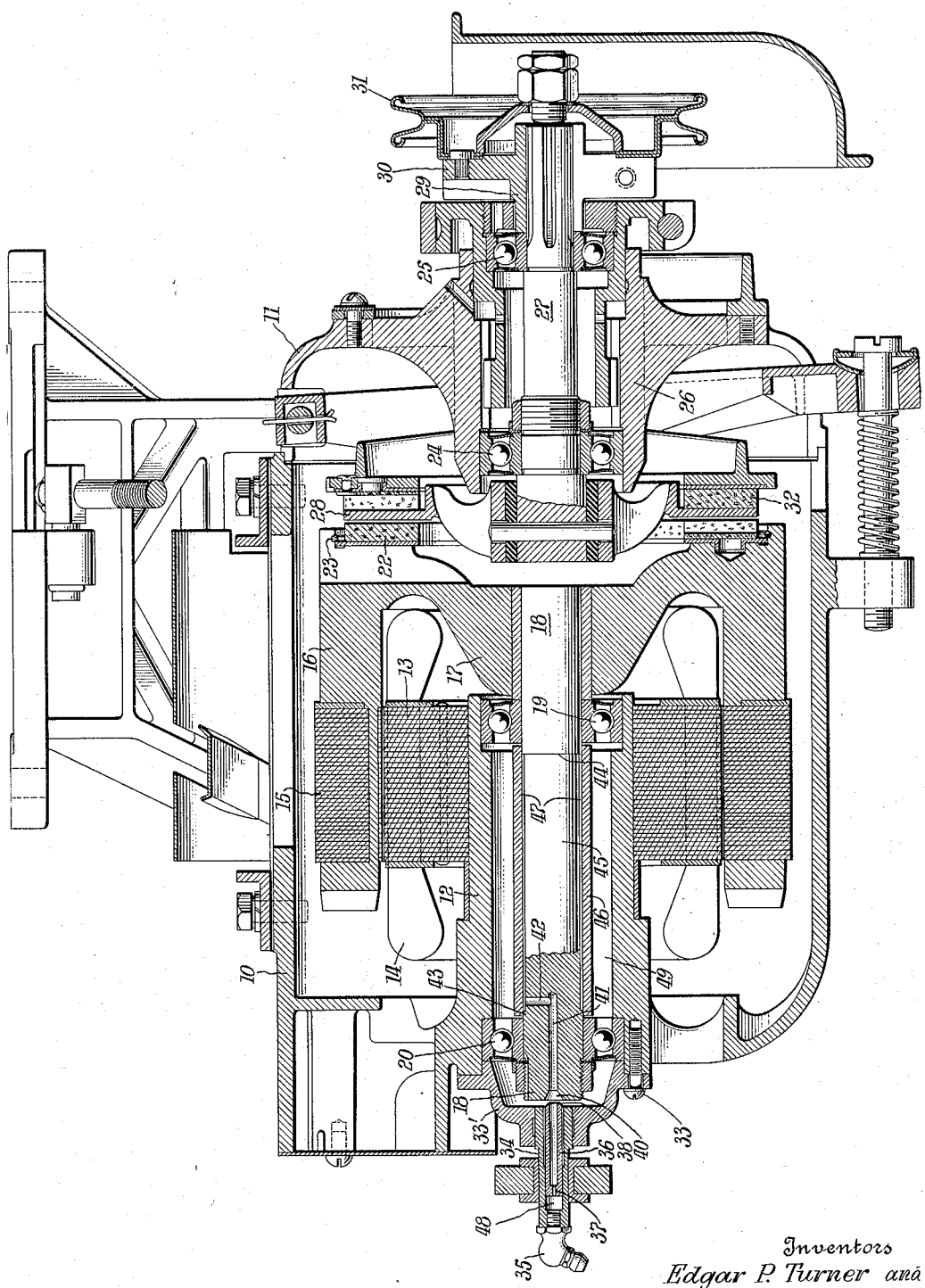

2,531,175

UNITED STATES PATENT OFFICE 2,531,175

LUBRICATING MEANS FOR ELECTRIC MOTOR-CLUTCH DRIVES

Edgar P. Turner, Fanwood, and Frank A. Hayes, Middletown, N. J., assignors to The Singer Manufacturing Company, Elizabeth, N. J., a corporation of New Jersey Application June 10, 1948, Serial No. 32,233

5 Claims. (Cl. 308—121)

This invention relates to unitary electric motor and power transmitter devices such as that used in garment manufacturing establishments as individual sewing machine drivers. These transmitters are usually located beneath the sewing machine tables and are required to operate over long periods of time without lubrication.

In transmitters of the above type, in which the inverted type of electric motor is used, the motor shaft is journaled in spaced ball-bearings carried by an inwardly extending tubular portion of the motor frame. As the bearings are located within the tubular frame portion, and as the shaft and bearings are enclosed to prevent lint, sizing and other foreign material from finding their way into the motor bearings, the motor shaft and ball-bearings are completely enclosed. It is the object of this invention to provide improved means for supplying lubricant through the rotary motor shaft to the enclosed ball-bearings in which the shaft is journaled and to meter the lubricant so that it will be supplied equally to the two bearings. A further object of this invention is to provide improved means for conducting lubricant from an external fitting to the bore in the shaft, which means becomes effective upon the application of grease under pressure at the fitting.

The above being among the objects of the present invention, further objects relating to details of construction will be apparent from the following detailed description.

The accompanying drawing represents a vertical sectional view taken through the center of an electric transmitter embodying our invention.

In the embodiment of our invention selected for illustration, the transmitter comprises a casing formed in two parts 10 and 11 secured together in the usual manner by screws (not shown) to form a substantial cylindrical casing or frame. The part 10 is formed with an inwardly extending central tubular portion 12 on which is tightly fitted a stationary electro-magnetic element 13 having the usual four pole, three phase winding 14. The rotary electromagnetic element is disposed externally of the stationary element 13 and comprises a ring type squirrel cage rotor 15 secured to a die-cast spider 16 having a hub 17, splined to one end of a motor shaft 18 journaled in the spaced ball-bearings 19 and 20 which are located interiorly of the tubular portion 12. The spider 16 has secured to it a driving friction disk 22 which is held in position in a suitable depression in the face of the spider by a split ring 23. The external rotor together with the spider are in effect a fly-wheel which acts as a driving element of the clutch.

Journaled in the bearings 24 and 25 carried by a hub 26 of the frame part 11 is a shaft 27 which has secured to its inboard end the driven element 28 of the clutch. The outboard end of the shaft 27 is splined to receive a split hub 29 having a radially extending flange 30 to which is secured a pulley 31 adapted to drive a sewing machine. The shaft 27 is adapted to be moved endwise by a suitable mechanism so as to cause the driven element 28 of the clutch to engage the driving element or the stationary brake 32. For a more complete and detailed description of the constructive features of the transmitter, reference is made to the co-pending patent application of Edgar P. Turner, Serial No. 696,828, filed September 13, 1946, for Electric Transmitters.

Fixed by screws 33 to the part 10 of the frame is a bell shaped cover plate 33' which has secured to its central portion a tubular stud 34 having a grease-gun fitting 35 screwed into its free end. Slidably fitted into the tubular stud 34 is a tube 36 having a reduced or restricted axial opening 37 in its end nearest the grease fitting, and its other end is tapered at 38 for entrance into a conical opening 40 formed axially in the end of the shaft 18. The conical opening 40 merges into a centrally arranged longitudinal conduit 41 which is connected to a radially arranged duct 42 formed in the shaft 18. The shaft 18 is also formed with two shoulders 43, 44 and a diametrically reduced portion 45 between said shoulders. Surrounding the reduced portion 45 of the motor shaft and extending a short distance over each of the shoulders 43, 44 is a sleeve 46 which defines together with the reduced portion of the shaft, a lubricant passageway 47 which communicates with the radial duct 42.

From the foregoing it will be apparent that when grease is supplied under pressure by a grease-gun through the fitting 35 the pressure of the grease in the chamber 48 will cause the tube 36 to slide to the right, as viewed in the drawing, and its tapered end 38 will be forced into the conical opening 40 in the shaft 18. When this occurs, the grease will flow through the restricted or reduced opening 37 of the tube 36, thence through the tube into the longitudinal bore 41, through the radial duct 42 and into the space 47 between the reduced shaft portion 45 and the sleeve 46. There is a slight clearance between the shoulders 43, 44 and the inner periphery of the sleeve 46 and, therefore, the grease under pressure will fan out radially of the shaft 18 and pass outwardly between the inner races of the ball-bearings and the ends of the sleeve 46 and ooze into the ball-bearings 19 and 20. It will be observed that when the transmitter is operating, centrifugal force will tend to throw the grease outwardly and into the bearings and that grease will be supplied equally to each bearing. It will also be observed that if too much lubricant is supplied to the bearings the excess will accumulate in the chamber 49 between the outer periphery of the sleeve 46 and the inner surface of the tubular frame portion 12, thereby preventing the excess grease from finding its way into the internal parts of the motor and its windings.

Having thus set forth the nature of the invention, what we claim herein is.

1. In an electric transmitter having a casing formed with a centrally arranged tubular portion carrying spaced ball-bearings, the combination of a motor shaft journaled in said bearings and formed with an opening in one of its ends, a tubular stud having its axis alined with the axis of the motor shaft and spaced therefrom, a tube formed with a restricted opening in one end and slidably mounted in said stud, means for supplying grease under pressure to one end of said stud, and conduits connecting the opening in the end of the shaft with said spaced ball-bearings.

2. In a motor-clutch driving device having a frame with a centrally arranged tubular portion carrying spaced ball-bearings, the combination of a shaft journaled in said bearings and formed with two shoulders arranged adjacent said bearings and providing a reduced portion therebetween, a sleeve enclosing the reduced portion of said shaft and extending over said shoulders to form a lubricant passageway restricted at each end, and means for forcing lubricant through said passageway and out through its restricted ends to the ball-bearings in which the shaft is journaled.

3. Means for supplying lubricant to the bearings of an electric motor of the external rotor type comprising a stud carried by the motor, a tube slidably mounted in the stud and having a restricted opening in one end, a motor shaft formed with an opening and having its end spaced from and arranged coaxial with said stud, lubricant conduits connecting the opening in the shaft with the shaft bearings, and a grease fitting carried by said stud whereby grease may be supplied to one end of said stud under pressure.

4. Means for supplying lubricant to the spaced ball-bearings of an electric motor of the external rotor type comprising a stud carried by the motor, a motor shaft formed with lubricant conduits and axially spaced from said stud, a grease fitting carried by said stud, a tube slidable in said stud for supplying grease from said fitting to the conduits in said motor shaft, said tube being effective when grease is supplied under pressure to said fitting, and means embracing said shaft for causing the grease supplied to said conduits to be delivered to each of said bearings.

5. A motor-clutch driving device having a frame including an internally arranged tubular portion, ball-bearings seated in and spaced from each other longitudinally of said tubular portion of the frame, a motor shaft journaled in said ball-bearings and having a diametrically reduced portion terminating in shoulders disposed adjacent and between said ball-bearings, a sleeve surrounding and spaced from the reduced portion of said shaft and overlying said shoulders in slightly spaced relation thereto, said sleeve and said tubular portion of the frame defining therebetween an excess lubricant storage chamber, and means including a lubricant conduit in said shaft for supplying lubricant through the space between said sleeve and the reduced portion of said shaft to said ball-bearings.

EDGAR P. TURNER.
FRANK A. HAYES.

REFERENCES CITED

The following references are of record in the file of this patent:

UNITED STATES PATENTS

| Number | Name | Date |
| --- | --- | --- |
| 2,038,293 | Jacob | Apr. 21, 1936 |
| 2,256,296 | Smith | Sept. 16, 1941 |
| 2,282,589 | Mayne | May 12, 1942 |